June 9, 1959 J. TE WINKEL 2,890,292

BROADBAND AMPLIFYING CIRCUIT

Filed March 4, 1955

INVENTOR
JAN TE WINKEL

BY

AGENT

United States Patent Office 2,890,292

Patented June 9, 1959

2,890,292

BROADBAND AMPLIFYING CIRCUIT

Jan te Winkel, Emmasingel, Eindhoven, Netherlands, assignor, by mesne assignments, to North American Philips Company, Inc., New York, N.Y., a corporation of Delaware Application March 4, 1955, Serial No. 492,242

Claims priority, application Netherlands March 17, 1954

1 Claim. (Cl. 179—171)

This invention relates to broadband amplifying circuits having negative feedback and comprising a cascade arrangement of a plurality of amplifying stages, each affected with an input capacity and an output capacity, and a bridge circuit for reducing the apparent value of either of the said capacities, comprising two tightly coupled coils, of which one is included in a circuit parallel to the impedance across which the negative feedback voltage is set up and the other is included in a circuit connecting one extremity of the said impedance to one terminal of the capacitor concerned, at least one of the said circuits including, in addition, a series capacitor.

In a prior suggestion such an amplifying circuit is described for compensating for the grid-cathode capacity of the last of a cascade of amplifying tubes, the cathode circuit of which includes the negative feedback impedance, so that signal currents are prevented from flowing from the anode of the last but one amplifying tube of the cascade arrangement via the grid-cathode capacity through the negative feedback impedance and hence detrimentally affecting the negative feedback coupling.

It is also known that the grid-cathode capacity of the first amplifying tube of such a cascade also detrimentally affects the maximum negative feedback obtainable, whilst this also applies to the anode-cathode capacity of the last tube. The object of the invention is to make at least two of the said capacitors apparently smaller, for example zero or even negative.

The invention is characterized in that the last-mentioned coil, for the purpose of also reducing the apparent value of another of the said capacities, is also connected via a capacitor to one terminal of said further capacity.

Figure 1:
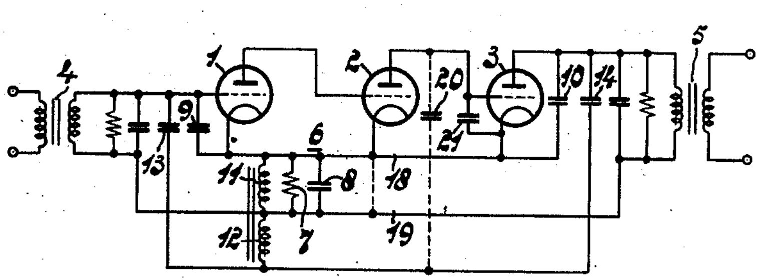
Figure 2:
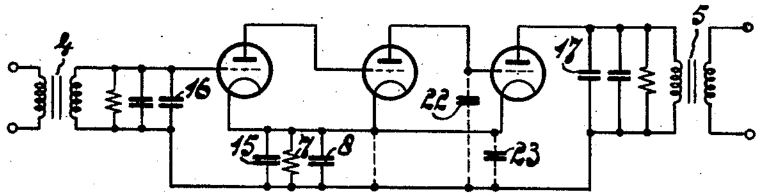

In order that the invention may be readily carried into effect, it will now be described, by way of example, with reference to the accompanying drawing in which Fig. 1 shows diagrammatically one embodiment of the invention and Fig. 2 shows the corresponding substitution diagram.

The amplifying circuit shown in Fig. 1 comprises a cascade arrangement of a plurality of amplifying elements 1, 2, 3 each having an input capacity and an output capacity. The amplifying elements may be constituted, for example, by amplifying tubes as shown in Fig. 1, in which event the input and output capacities are constituted by the inter-electrode capacities, wiring and earth capacities and any further capacitors that may be provided for any reason whatever. However, use may alternatively be made of transistors as amplifying elements, in which event allowance has also to be made for the virtual capacitances occurring due to space charges and transit-time effects in the transistor crystal.

The signals to be amplified having a frequency band of, for example, from about 100 c./s. to, for example, some mc./s. are supplied via an input transformer 4 to the amplifying element 1 and, after being amplified, derived from an output transformer 5. The power supply for the amplifying elements and the coupling elements between them are omitted for the sake of clearness.

The output circuit of the amplifying element 3 includes an impedance 6, more particularly a resistor 7, if desired in series with a small inductance (not shown), and in parallel therewith the natural and wiring capacity 8, the negative feedback impedance 6 having set up across it a negative feedback voltage which is supplied back to the input circuit of the amplifying element 1.

As is well-known, the input capacitance 9 of the amplifying element 1 and the output capacitance 10 of the amplifying element 3 detrimentally affect the maximum amplification obtainable. In order to nitigate the said disadvantage, the negative feedback impedance 6 has connected in parallel with it a coil 11 which is tightly coupled to a coil 12 by which the lower extremity of the negative feedback impedance 6 is connected via a capacitance 13 to the upper side of capacitor 9 and also via a capacitance 14 to the upper side of capacitor 10.

Assuming the number of windings of coil 12 to be $n$ times larger than that of the coil 11 and the capacitors 13 and 14 to be $n$ times smaller than the capacitances 9 and 10, it is found, as shown in the substitution diagram of Fig. 2, that the capacitances 9 and 10 have been compensated for and have effectively disappeared completely. True, they are now substituted for by a capacitance 15 parallel to the negative feedback impedance 7, 8 and capacitances 16, 17 parallel to the input and output transformers 4, 5, but nevertheless it is found in practice that the maximum negative feedback obtainable can thus be increased and can be increased more as $n$ is given a higher value, for example from 2 to 3, or the capacitors 13, 14 have higher values than $1/n$ times the capacitances 9, 10; in the latter case these capacitances have been overcompensated for and effectively become negative. However, since the foregoing involves a reduction of the maximum amplification obtainable, which otherwise need not be objectionable if the number of amplifying elements is sufficiently large, it is necessary to aim at a compromise.

More particularly, if the lead 18 is connected to earth, it is found in practice that the maximum negative feedback obtainable can be materially increased in the described manner. However, if the lead 19 is connected to earth, in which event the cathode of tube 2 normally is connected to the lead 19 instead of to the lead 18 (shown in dotted line), a comparatively high value of the maximum negative feedback obtainable is already obtained in practice even without the use of the coils 11, 12 and the capacitors 13, 14, so that the said amplification provides a smaller improvement.

Nevertheless it is in this case also possible to obtain a material further improvement if the lower extremity of coil 12 is connected in known manner via a capacitor 20 to the upper side of an input capacitor 21 of the amplifying element 3, in which event by suitable proportioning the capacitor 21 may be fully compensated for, so that output current cannot flow from the amplifying element 2 via capacitor 21 through the negative feedback impedance 6. The capacitors 22, 23 which become substituted for the capacitors 20, 21 in this case play only a subordinate part. It will be evident that in the last-mentioned case, for example, the capacitor 14 may be omitted, so that the maximum feedback obtainable becomes slightly smaller but the maximum amplification obtainable may be slightly increased.

The circuit arrangement shown is naturaully also applicable to other numbers of amplifying elements. By including, in addition, a capacitor, in series with coil 11 (not shown), at least one of the capacitors 13, 14, 20 may be rendered superfluous, if desired, with suitable proportioning. However, this circuit has the disadvantage that the coils 11 and 12, as a rule, are required to be matched to a higher impedance and this involves higher cost.

What is claimed is:

An amplifying circuit comprising a plurality of amplifier stages connected in a cascade arrangement, the first of said stages having a signal input electrode and an input capacitance connected between said signal input electrode and a common point, the last of said stages having a signal output electrode and an output capacitance connected between said signal output electrode and said common point, an input circuit connected to said signal input electrode, an output circuit connected to said signal output electrode, means connected between said input circuit and said output circuit to form a negative feedback connection, a first coil connected between said negative feedback connection and said common point, a second coil tightly coupled inductively to said first coil and having an end thereof connected to said negative feedback connection, a first capacitor connected between the remaining end of said second coil and said signal input electrode, and a second capacitor connected between said remaining end of the second coil and said signal output electrode, whereby said first and second coils, said input and output capacitances, and said first and second capacitors form a bridge circuit for reducing the effective values of said input and output capacitances.

References Cited in the file of this patent

UNITED STATES PATENTS

| | | |
|---|---|---|
| 2,033,274 | Burton | Mar. 10, 1936 |
| 2,247,218 | Braaten | June 24, 1941 |
| 2,556,219 | Roche et al. | June 12, 1951 |
| 2,770,683 | Jackson | Nov. 13, 1956 |

FOREIGN PATENTS

| | | |
|---|---|---|
| 271,253 | Great Britain | May 26, 1927 |